United States Patent
Simon et al.

(10) Patent No.: US 7,249,202 B2
(45) Date of Patent: Jul. 24, 2007

(54) SYSTEM AND METHOD FOR DMA TRANSFER OF DATA IN SCATTER/GATHER MODE

(75) Inventors: Moshe B. Simon, San Ramon, CA (US); Erik P. Machnicki, Sunnyvale, CA (US); Mark Longley, Livermore, CA (US)

(73) Assignee: Cradle Technologies, Inc., Sunnyvale, CA (US)

( * ) Notice: Subject to any disclaimer, the term of this patent is extended or adjusted under 35 U.S.C. 154(b) by 504 days.

(21) Appl. No.: 10/899,196

(22) Filed: Jul. 26, 2004

(65) Prior Publication Data

US 2005/0027901 A1 Feb. 3, 2005

Related U.S. Application Data

(60) Provisional application No. 60/492,060, filed on Jul. 31, 2003.

(51) Int. Cl.
*G06F 13/28* (2006.01)
*G06F 3/00* (2006.01)

(52) U.S. Cl. .......................... 710/22; 710/30; 710/36; 710/52; 709/212; 709/250

(58) Field of Classification Search ................ 710/22, 710/30, 52, 36; 709/212, 250
See application file for complete search history.

(56) References Cited

U.S. PATENT DOCUMENTS

| 5,991,817 | A * | 11/1999 | Rowett et al. | 709/250 |
| 6,647,438 | B1 * | 11/2003 | Connor et al. | 710/22 |
| 2003/0065735 | A1 * | 4/2003 | Connor | 709/212 |
| 2003/0120835 | A1 * | 6/2003 | Kale et al. | 710/22 |

OTHER PUBLICATIONS

IBM-TDB "Priority Scheme for Arithmetic Logic Unit and Dataflow Usage by P1394 Isochronous Hardware", p. 477-480, vol. 38, Issue 2, Pub. Date-Feb. 1, 1995.*

* cited by examiner

*Primary Examiner*—Tammara Peyton
(74) *Attorney, Agent, or Firm*—Schneck & Schneck; Thomas Schneck

(57) ABSTRACT

A method and system for DMA transfer of data in scatter/gather mode. A table of buffer descriptors may be used to determine the next buffer to be used when a current buffer storing data that has been transferred or will be transferred and may be used in automatic buffer switching, which does not require processor intervention. Entries in the table of buffer descriptors are entered programmatically. The method and system also provide for hardware writing to table of packet descriptors which describes location and size of incoming data and can indicate whether a packet of data straddles two or more buffers, thus decoupling packet sizes from buffer sizes.

9 Claims, 6 Drawing Sheets

Fig._1

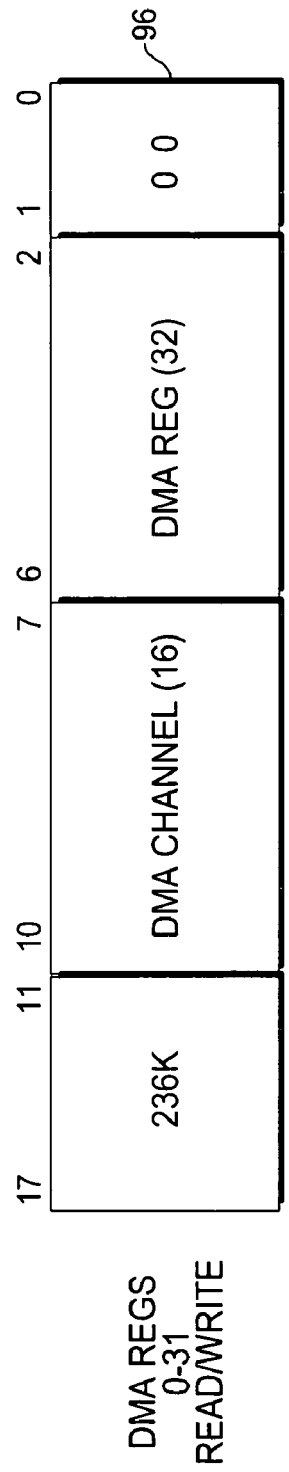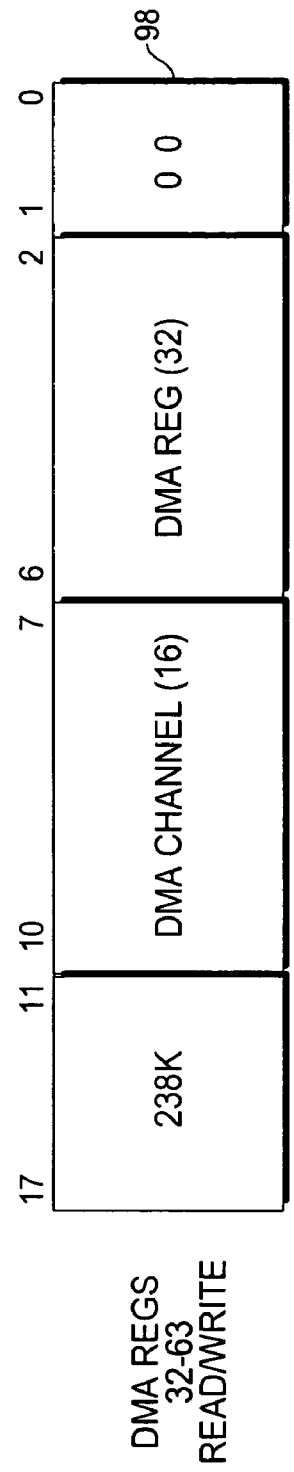

Fig._5

SYSTEM AND METHOD FOR DMA TRANSFER OF DATA IN SCATTER/GATHER MODE

CROSS REFERENCE TO RELATED APPLICATION

This application claims the benefit of provisional U.S. patent application entitled "Digital Signal Coprocessor," application No. 60/492,060, filed on Jul. 31, 2003.

TECHNICAL FIELD

This invention relates to the transfer of data between a processor and an attached device, particularly DMA transfer of data.

BACKGROUND OF THE INVENTION

Processors whose computer bus architectures have Direct Memory Access ("DMA") capability may transfer data between a device attached to the processor (such as disk controllers, graphics cards, etc.) and the processor's system memory independent of the main CPU. DMA allows devices of different speeds to communicate without placing a processing burden on the CPU. DMA further speeds up data transfer by eliminating the fetch and execute cycles required when data transfers pass through the CPU.

In a DMA transfer, the CPU stops its bus activity to allow the DMA operation. A DMA controller then reads or writes memory bytes and transfers the data to the desired location; generally, a DMA transfer involves either a device read and memory write or a memory read and a device write. FIFO buffers may be used to store the data to be transferred.

It would be advantageous to enhance DMA transfer of data.

SUMMARY OF THE INVENTION

This need has been met with a method and system for DMA transfer of data in "scatter/gather" mode. In one embodiment, a table of buffer descriptors may be used to determine the next buffer to be used when a current buffer storing data that has been transferred or will be transferred and may be used in automatic buffer switching, which does not require processor intervention. The method and system also provide for a table of packet descriptors which describes location and size of incoming data and can indicate whether a packet of data straddles two or more buffers, thus decoupling packet sizes from buffer sizes. The method and system also provide for optional end-of-buffer and end-of-packet notifications to the controlling processor as well as optional termination by hardware, without software intervention, on an end-of-buffer condition.

In one embodiment, a method of transferring data between a processor and an attached direct memory access ("DMA") device in scatter/gather mode comprises maintaining a table of buffer descriptors for determining a start address and size of a next buffer to be used when transferring data when a current buffer counter reaches zero, wherein entries in the table are linked programmatically; transferring data between a current buffer and the device via DMA; automatically switching buffers when the selected buffer counter reaches zero, wherein a next buffer descriptor table entry is read from memory and a new buffer pointer and size is updated based on the table entry; and transferring data between the next buffer and the device via DMA.

In another embodiment, a processor for transferring data between the processor and an attached direct memory access ("DMA") device in scatter/gather mode comprises means for connecting the processor to the DMA device; a plurality of buffers for storing data transferred between the DMA device and the processor, each of the plurality of buffers having a buffer counter; a buffer descriptor table for each Data In FIFO and each Data Out FIFO of a DMA channel transferring data between the DMA device and the processor, each entry in the buffer descriptor table having a buffer address of one of the plurality of buffers, a buffer size of one of the plurality of buffers, and sequencing information for calculating a start address and size of a next buffer to be used for storing data transferred between the DMA device and the processor when a current buffer counter reaches zero, wherein entries in the buffer descriptor table are made programmatically; and a bus interface unit for transferring data between the DMA device and the processor, the bus interface unit including hardware for automatically fetching the calculated start address and size of the next buffer to be used to store data transferred between the DMA device and the processor from the buffer descriptor table so the bus interface unit can automatically switch buffers for storing data transferred between the DMA device and the processor when the current buffer counter reaches zero.

In another embodiment, a method of transferring data between a processor and an attached direct memory access ("DMA") device in scatter/gather mode comprises transferring a packet of data from the DMA device to the processor; detecting an end-of-packet condition; and writing out a packet descriptor to a table in memory, wherein the packet descriptor includes a packet start address, a packet size, and a bit indicating whether the packet is split across a buffer boundary.

In another embodiment, a processor for transferring data between the processor and an attached direct memory access ("DMA") device in scatter/gather mode comprises the means for connecting the processor to the DMA device; a plurality of buffers for storing data transferred between the DMA device and the processor; and a bus interface unit for transferring data between the DMA device and the processor, the bus interface unit including hardware for detecting an end-of-packet event and writing a packet descriptor to a packet descriptor table for each Data In FIFO of a DMA channel, each packet descriptor having a packet start address, a packet size, and a bit indicating whether the packet is split across a buffer boundary, wherein packet descriptors are written to the packet descriptor table each time an end-of-packet event is detected.

BRIEF DESCRIPTION OF THE DRAWINGS

FIG. 3a is a block diagram of the format of DMA registers in accordance with the invention.

FIG. 3b is a block diagram of the format of DMA registers in accordance with the invention.

DETAILED DESCRIPTION OF THE INVENTION

Figure 1:
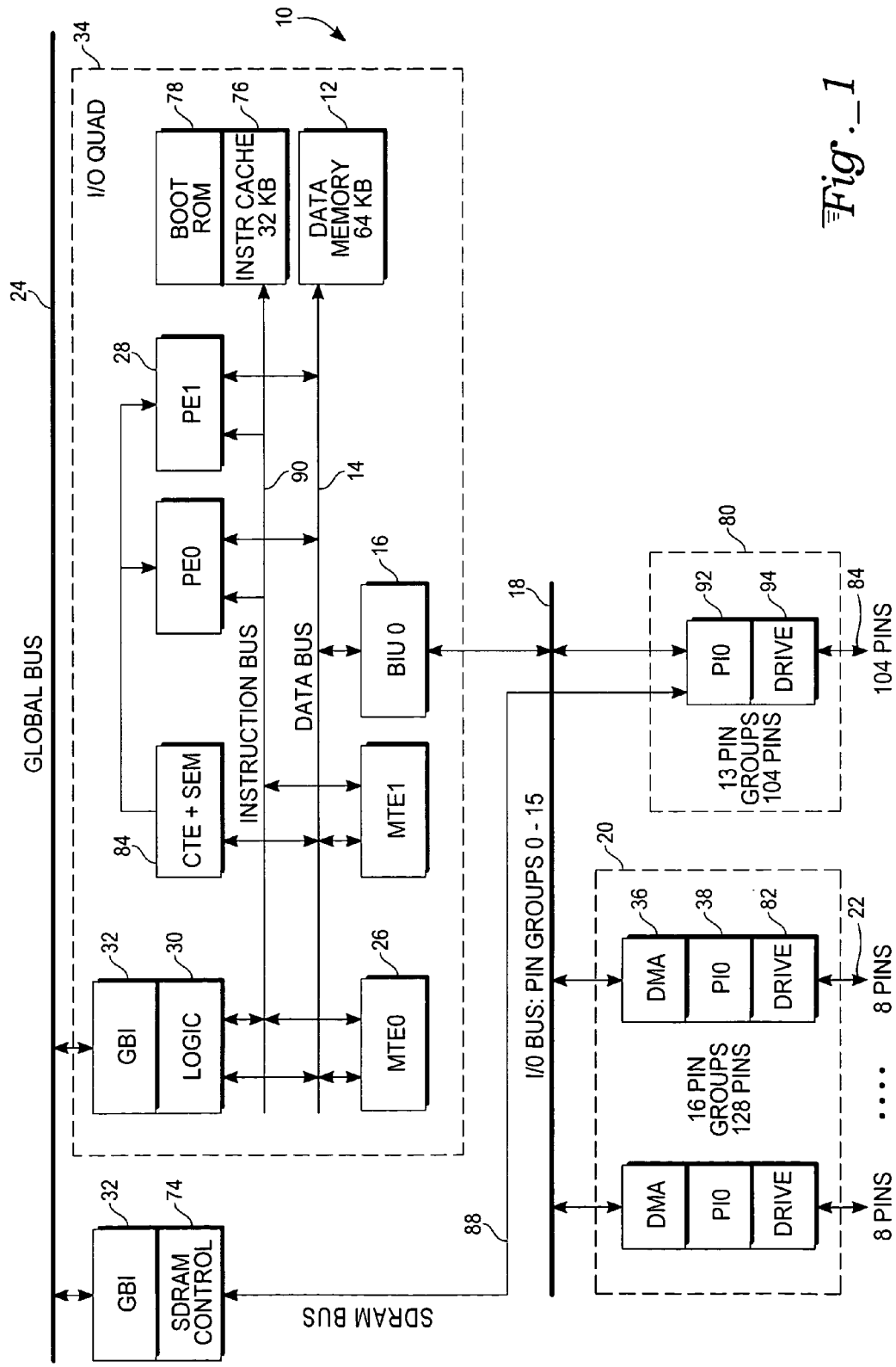
FIG. 1 is a block diagram of a processor's programmable I/O system and devices attached to the processor in one embodiment of the invention.

In FIG. 1, a processor (such as Cradle's CT3400, a multiprocessor digital signal processor) contains a programmable I/O system 10. The programmable I/O system features an I/O "quad" 34 (a processing core within the processor) connected to the processor's global bus 24. Data can be transferred to and from the quad 34 to the global bus 24 via a global bus interface ("GBI") 32 and a quad interface logic unit 30. The I/O quad 34 has boot ROM 78, an instruction cache 76, a counter timer engine and semaphores 84, data memory 12, a data bus 14, an instruction bus 90, a processing element ("PE") 28, and a memory transfer engine ("MTE," used to control I/O transfers in non-scatter/gather and non-DMA configurations) 26, and a bus interface unit ("BIU") 16, which, along with an I/O bus 18, provides communication between the subsystem's 10 data bus 14 and pin groups 20 within the subsystem. Each pin group 20 contains an output driver 82, logic for high speed direct memory access ("DMA") 36 block transfer, and programmed I/O ("PIO") 38 transfer of data. Each of the pins 22 in each pin group 20 (in this embodiment, there are 8 pins per pin group and 16 pin groups; however, in other embodiments, different numbers of pins per pin group and different numbers of pin groups may be employed) may be configured as either a low-speed PIO pin or a high speed DMA I/O pin depending on the attached device (i.e., a DMA pin is for a DMA device). The processor may also have an SDRAM device attached. In this embodiment, 13 pin groups 80 (each group 80 has 8 pins 84; however, in other embodiments different numbers of pins per pin group and different numbers of pin groups may be employed), each with an output driver 94 logic for programmed I/O transfer of data 92 are implemented for SDRAM. Data is transferred to and from the SDRAM device and the global bus 24 via the I/O bus 18, an SDRAM bus 88, the SDRAM control 74, and a GBI 32. (The details of this processor and the programmable I/O system are included here for exemplary purposes only and other embodiments of the invention may have processors using different elements and/or arrangement of elements than described here.)

In one embodiment, the BIU can support up to 4 DMA channels, or DMA devices. (Other embodiments of the invention may support a different number of DMA channels.) Each DMA channel interfaces to one or more pin groups which functionally implements one I/O device. The BIU provides FIFO data buffering for up to 4 DMA devices, each of which has four FIFOs (Data In, Data Out, Command, and Status) in the BIU. The BIU assembles commands and outgoing data from the local data bus and places the data in the BIU's Data Out FIFO for transport to the DMA device's pin group FIFOs and assembles commands and incoming data from the device's pin group FIFOs and places the incoming data in the BIU's Data In FIFO for transport to the local data bus to be stored in memory. Transport of commands, status, and data between the BIU FIFOs and memory/processors is done either programmatically by the MTE (in non-scatter/gather and non-DMA configurations) or automatically by the BIU DMA engine. The BIU provides FIFO data assembly and buffering on demand, as requested by the MTE and/or the pin groups of the DMA device, and optionally also FIFO data transportation to and from chip memory.

Figure 2:
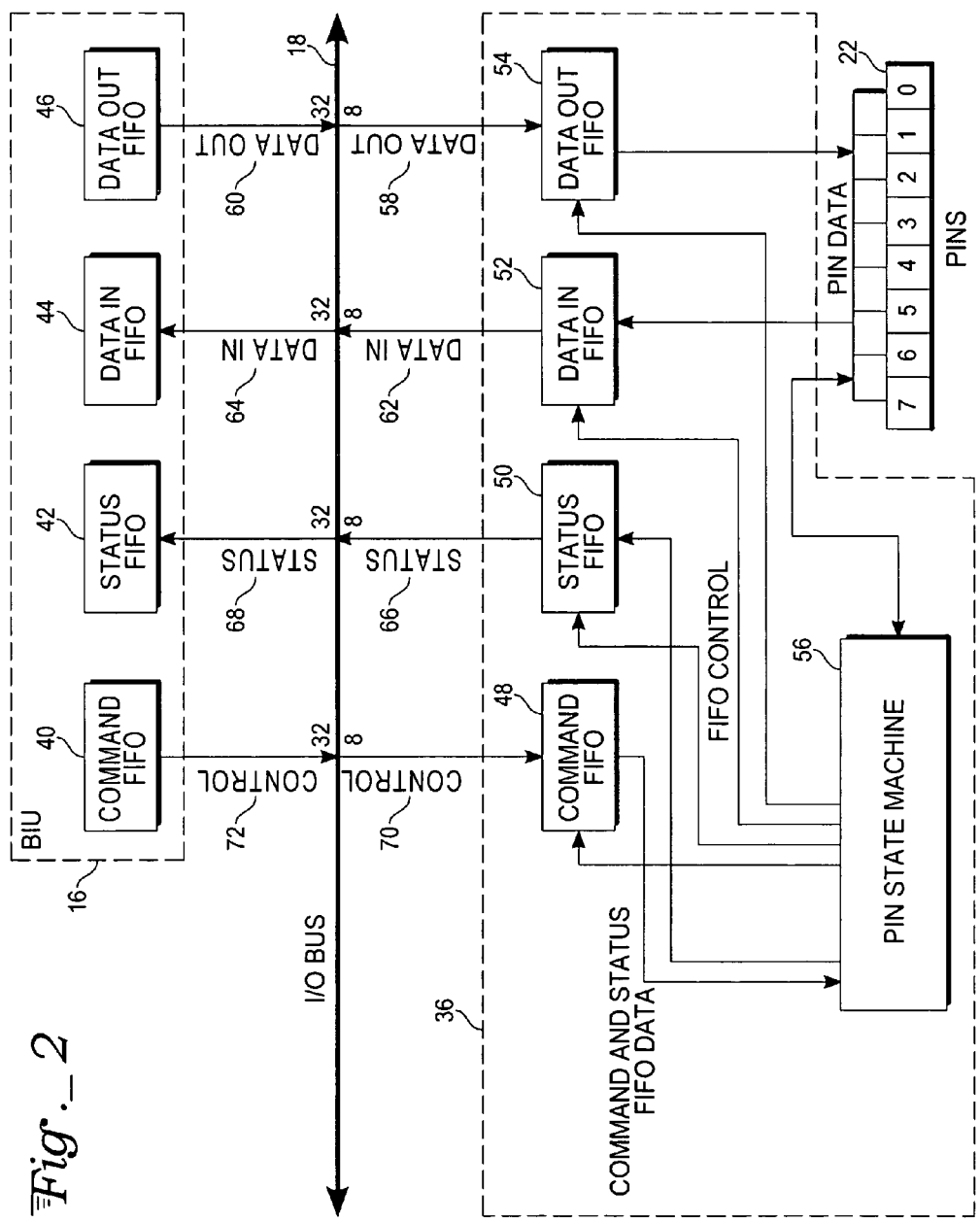
FIG. 2 is a block diagram of a processor's bus interface unit and DMA logic for a device's pin group in accordance with the invention.

With reference to FIG. 2, the BIU 16 receives and sends data to the DMA logic 36 in each pin group via the I/O bus 18 (in one embodiment, a 32-bit pipelined bus, though this may vary in other embodiments). The BIU 16 initiates all I/O bus transfers and addresses I/O devices on the bus. Data from pins 22 of an I/O device is transferred to a Data In FIFO 52 or from a Data Out FIFO 54 in the DMA logic 36. As noted above, the BIU 16 provides FIFO data buffering for up to 4 DMA devices, each of which has four FIFOs—Data In 44, Data Out 46, Command 40, and Status 42—in the BIU 16. There are 32-bit lines 72, 68, 64, and 60 between the FIFOs 40, 42, 44, and 46 and the I/O bus 18 (in other embodiments, the lines may handle different numbers of bits). The DMA logic 36 also has four FIFOs—Command 48, Status 50, Data In 52, and Data Out 54. There are 8-bit lines between these FIFOs 48, 50, 52, and 54 and the I/O bus 18 (in other embodiments, the lines may handle different numbers of bits). A pin state machine ("PSM") 56 is used to control movement of data between pins 22 of the DMA device and data FIFOs; the PSM 56 controls the other hardware in the pin group, including FIFOs 48, 50, 52, 54, and pins 22.

Each DMA device has 32 addressable registers which are mapped to the I/O quad address space. (In other embodiments, another number of registers may be employed). The format of the DMA register addresses for DMA registers 0-31 96 and DMA registers 32-63 98 are shown in FIGS. 3*a* and 3*b*, respectively. PEs and MTEs read data from and supply data to their DMA device FIFOs in the BIU through these addresses. A sample table describing the DMA registers as seen from the local bus is included below. The R/W column indicates the read/write capability of the register: RO means read only; RW means read/write capable; WO means write only; and RC means read to clear. The function column indicates whether the register is in the BIU ("BIU") or in the pin groups ("DMA"). In one embodiment, registers in the BIU are 32 bits, though registers may be other sizes in other embodiments.

TABLE 1

| Reg | R/W | Function | Name | Notes |
|---|---|---|---|---|
| 0 | RW | BIU | DMA Data FIFO | Read = Data in, Write = Data out (1 byte) |
| 1 | | | | Reserved |
| 2 | RW | BIU | DMA Data FIFO | Read = Data in, Write = Data out (2 bytes) |
| 3 | | | | Reserved |
| 4 | RW | BIU | DMA Data FIFO | Read = Data in, Write = Data out (4 bytes) |
| 5 | | | | Reserved |

TABLE 1-continued

| Reg | R/W | Function | Name | Notes |
|---|---|---|---|---|
| 6 | RW | BIU | DMA Data FIFO | Read = Data in, Write = Data out (8 bytes) |
| 7 | | | | Reserved |
| 8 | RW | BIU | DMA Command/Status | Read = Status, Write = Command (1, 2, 4, or 8 bytes) |
| 9 | RW | BIU | Data In FIFO Packet Descriptor Table Pointer | For scatter/gather; updated in place |
| 10 | RW | BIU | Data Out FIFO Buffer Descriptor Table Pointer | For scatter/gather; updated in place |
| 11 | RW | BIU | Data In FIFO Buffer Descriptor Table Pointer | For scatter/gather; updated in place |
| 12 | RW | BIU | Data Out FIFO Parameters | |
| 13 | RW | BIU | Data in FIFO Parameters | |
| 14 | RW | BIU | Command FIFO Parameters | |
| 15 | RW | BIU | Status FIFO Parameters | |
| 16 | WO | BIU | BIU FIFO Control | Enable, reset for Data In, Data Out, Command, Status FIFOs |
| 17 | RO | BIU | DMA Data In Byte Enables | |
| 18:19 | RW | DMA | DMA Address Register | 18 = Address register, 19 = $2^{nd}$ word for 64 bit address |
| 20:21 | RW | DMA | DMA DC 0 | Data Constant 0 |
| 22:23 | RW | DMA | DMA DC 1 | Data Constant 1 |
| 24 | RW | BIU | Data Out FIFO DMA Address | For interrupt, DMA, scatter/gather; updated in place |
| 25 | RW | BIU | Data Out FIFO Buffer; End Interrupt Address | For scatter/gather; |
| 26 | RW | BIU | Data In FIFO DMA Address | For interrupt, DMA, scatter/gather; updated in place |
| 27 | RW | BIU | Data In FIFO Buffer-End Interrupt Address | For scatter/gather; |
| 28:29 | RW | BIU | Command FIFO Address | Command FIFO Addresses for Interrupt of DMA, error |
| 30:31 | RW | BIU | Status FIFO Address | Status FIFO Addresses for Interrupt or DMA, error |
| 32 | RW | BIU | Data In FIFO Packet Descriptor Table Tail | For scatter/gather; |
| 33 | RC | BIU | Data In FIFO Packet Descriptor Status | For scatter/gather; |
| 34 | RW | BIU | Data In FIFO Packet-End interrupt address | For scatter/gather; |

The BIU translates I/O register addresses between the local data bus and the I/O bus. This mapping of DMA register addresses as seen by the pin group is shown in Table 2 below. An "X" in the BIU column indicates these registers are in the BIU, not the pin groups. When the control, status, and data FIFOs are accessed from the local data bus, the FIFOs in the BIU are communicated with. The BIU communicates with the pin group FIFOs using some of these same addresses on the I/O bus; specifically, it uses DMA register addresses 0, 2, 4, and 6 as the address of the data FIFOs and register address 8 for the control/status FIFOs.

TABLE 2

| Type | Reg | R/W | BIU | Function | Notes |
|---|---|---|---|---|---|
| DMA | 0 | RW | X | DMA Data FIFO | Read = Data in, Write = Data out(1 byte) |
| DMA | 1 | | | Reserved | unused |
| DMA | 2 | RW | X | DMA Data FIFO | Read = Data in, Write = Data out(2 bytes) |
| DMA | 3 | | | Reserved | |
| DMA | 4 | RW | X | DMA Data FIFO | Read = Data in, Write = Data out (4 bytes) |
| DMA | 5 | | | Reserved | Unused |
| DMA | 6 | RW | X | DMA Data FIFO | Read = Data in, Write = Data out (8 bytes) |
| DMA | 7 | | | reserved | unused |
| DMA | 8 | RW | | DMA Control/ Status FIFO | Read = Status, Write = Cmd (1, 2, or 4 bytes) |
| DMA | 9:11 | | X | Scatter/Gather Registers | |
| DMA | 12:15 | | X | FIFO Parameters | In the BIU only |
| DMA | 16 | | | BIU/Pin Group FIFO Control | Controls both BIU and pin group FIFOs |
| DMA | 17 | | | reserved | |
| DMA | 18:19 | RW | | Address Register | 18 = Addrs reg. 19 = 2$^{nd}$ word for 64 bit |
| DMA | 20:21 | RW | | DMA DC 0 | 20 = DC reg. 21 = 2$^{nd}$ word for 64 bit |
| DMA | 22:23 | RW | | DMA DC 1 | 22 = DC reg. 23 = 2$^{nd}$ word for 64 bit |
| DMA | 24:34 | | X | FIFO and scatter/gather | In the BIU only |

Figure 4:
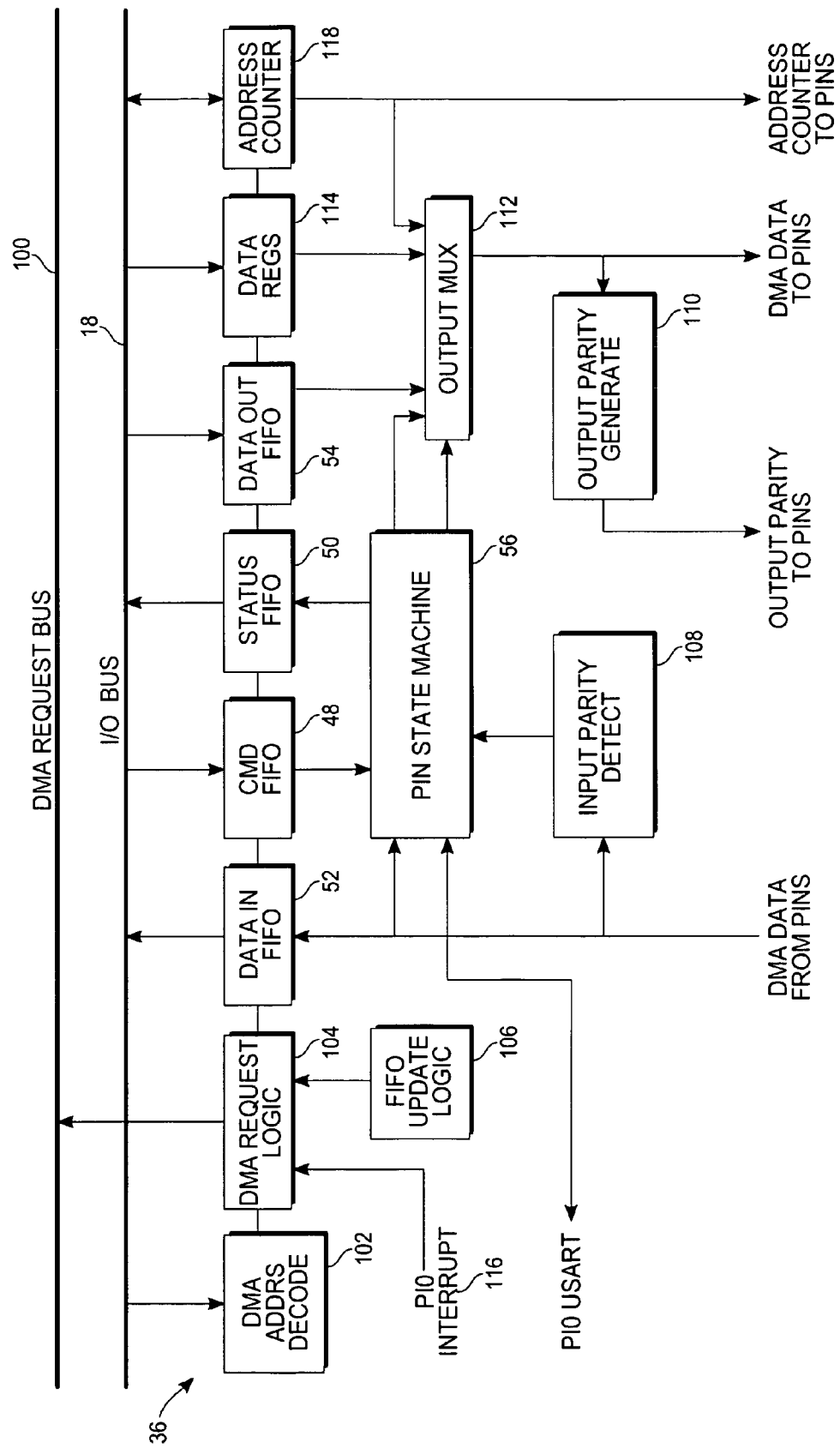
FIG. 4 is a block diagram of DMA logic in accordance with the invention.

In FIG. 4, the DMA logic 36 is shown in greater detail. The DMA logic 36 consists of a PSM 56, four FIFOs 52, 48, 50, and 54 (each of which has an associated FIFO request counter), an address counter 118, byte parity generate and detect units 110, 108, FIFO update logic 106, DMA request logic 104, and a DMA address decoder 102. As noted above, the PSM 56 controls movement of data between the pins and the data FIFOs 52, 54 (by providing sequence, handshake, and timing control for DMA transfers, decoding commands from the MTE, and generating transfer commands to its associated I/O FIFO). The PSM 56 communicates with a PE or MTE in the quad through the command FIFO 48 (from which the PSM 56 receives commands) and status FIFO 50 (to which the PSM 56 sends status updates). The FIFO update logic 106 fills the command FIFO 48 and data out FIFO 54 and empties the status FIFO 59 and data in FIFO 52. The FIFOs 52, 48, 50, and 54 work with the larger FIFOs in the BIU. When a DMA FIFO has data for the BIU or needs data from the BIU, the FIFO update logic 106 submits a request to the DMA request bus 100, which is associated with the I/O bus 18 (in some embodiments, the DMA request bus 100 and the I/O bus 18 are collocated). The DMA request bus 100 goes to the BIU, where the service request is translated into a data transfer between the DMA logic FIFO and the corresponding Data In FIFO in the BIU. When the DMA request logic 104 receives a PIO interrupt signal 116 or if one of the FIFO request counters is non-zero, a DMA service request is generated. The DMA logic 36 also has data registers 114, an address counter 118, and an output multiplexer 112. The data registers 114 may be used to supply or receive data constants and the address counter 118 may be used to supply and increment addresses to the pins. The data in and data out FIFOs 52, 54 have serial to parallel and parallel to serial logic, respectively, allowing the DMA logic 36 to accept and supply data in widths of 1, 2, 4, or 8 bits wide under the control of the PSM 56. An output multiplexer 112 delivers data to pins.

To transfer data, FIFOs in each DMA device submit a request, in the form of a DMA service code, via the DMA request logic to the DMA request line in the BIU. (The Data In and Status FIFOs generate requests when they have data for the BIU; the Data Out and Command FIFOs generate requests when they have space available for data from the BIU.) The DMA service code includes the DMA device code and two bits indicating which FIFO is requesting service; the code is decoded by the BIU and selects the appropriate DMA device and read/write transfer type. The requesting device receives service in the form of a bus transfer at its DMA address as long as no quad bus access is pending. Depending on the DMA service code, the bus transfer supplies or accepts data from the DMA device FIFO.

As noted above, the BIU contains four merge FIFOs for each DMA device. Input data and status information sent from the pin groups is aggregated and placed in the BIU FIFOs while output data and commands from the BIU FIFOs is split up and sent to the respective pin groups. In one embodiment, there are sixteen FIFOs implemented in a single dual port RAM. Each FIFO is 8 octets of 8 bytes per octet deep, a total of 128 octets (1 KB) of dual port RAM. (In other embodiments, different numbers of FIFOs and different amounts of RAM may be employed.)

The BIU can operate in one of three different event-driven modes: interrupt mode, DMA mode, and scatter/gather mode, which is an enhanced DMA mode. (In other embodiments of the invention, the BIU may operate in fewer or more modes than described here.) In interrupt mode the BIU issues an interrupt by writing a word to the interrupt address of the FIFO register when a block is ready for transfer to or from the data bus. The command and status FIFOs generally operate in interrupt mode. In automatic DMA mode, the BIU automatically transfers data to or from memory to or from the location defined by the BIU FIFO transfer address when a block is ready for transfer. Scatter/gather mode employs automatic buffer switching during DMA transfer of data. The mode in which the BIU operates is determined by a DMA FIFO parameters register. An example of the BIU FIFO parameters register format used in one embodiment is shown below in Table 3 (in other embodiments, other formats may be used).

TABLE 3

| Bits | No | Type | Function | Comments |
|---|---|---|---|---|
| 31 | 1 | RW | Error Interrupt Enable | |
| 30 | 1 | RW | Interrupt/DMA Enable | |
| 29:28 | 2 | RW | DMA device width: 1/2/4 bytes | Bytes per transfer to/from I/O bus |
| 27:25 | 3 | RW | Big Endian (BE) code | For endian swap on transfer |
| 24:23 | 2 | RW | Byte position = LSB position on I/O bus | Byte rotate by 0–3 bytes |
| 22:21 | 2 | | reserved | |
| 20 | 1 | RW | Count Mode: 0 = absolute, 1 = differential | |
| 19 | 1 | RW | Mode: 1 = DMA, 0 = Interrupt | DMA = automatic DMA to memory |
| 18 | 1 | RO | Read End | Read End byte has left BIU FIFO |
| 17 | 1 | RW | Increment Address per transfer | Increment address on DMA xfer |
| 16 | 1 | RW | 64 Bit | 64-bit DMA device - data FIFOs only |

TABLE 3-continued

| Bits | No | Type | Function | Comments |
|---|---|---|---|---|
| 15:14 | 2 | RW | Block size/Watermark | 1/2/4 or 0/2/4/6 octets |
| 13:7 | 7 | RO | I/O bus Counter/reserved | Function depends on bit 20 |
| 6:0 | 7 | RO | D Bus Counter/FIFO count | Function depends on bit 20 |

Scatter/gather is an advanced method of operating a BIU channel in DMA mode. It is available for Data In and Data Out FIFOs, not command and status FIFOs.

The BIU uses a table of buffer descriptors in scatter/gather mode for each Data In and Data Out FIFO. A table of packet descriptors for each Data In FIFO (i.e., each incoming scatter/gather DMA channel) is optionally created, for instance, for use with packet-based I/O interfaces. These tables may be located anywhere; in one embodiment, they are located in the I/O Quad data memory. Each table contains a sequence of entries; in one embodiment, the table of buffer descriptors is up to 128 entries long and the table of packet descriptors can have anywhere from 32 to 256 entries. Each entry in the buffer descriptor table consists of a buffer address, a buffer size, and sequencing information for calculating the next table entry's location. The entries in the buffer descriptor table are linked in a programmable (i.e., not necessarily sequential or circular) order. The non-linear link sequence of entries in the table can be changed dynamically, allowing reordering of IO data with minimal memory reads/writes, since changing address bits changes the order in which buffers are used. Each entry in the packet descriptor table consists of a packet start address, a packet size, and a bit indicating whether the packet is split across a buffer boundary, decoupling packet sizes from buffer sizes.

In scatter/gather mode, the BIU hardware performs DMA to/from the current buffer and performs automatic buffer switching. Buffer switching consists of reading the next buffer descriptor table entry from memory, where the descriptor (indicated by the sequencing information in each entry in the buffer descriptor table) is automatically fetched by hardware, and updating the buffer pointer and size from the table entry; thus, the next buffer address is obtained automatically from a table in memory by hardware. A buffer-end interrupt is optionally generated.

Data transfer is most efficient for Data Out FIFOs if the buffer sizes are a multiple of the DMA device width size and the start address is aligned on a width size boundary. For example, if the device is a 16-bit device with 2 data pin groups, the buffer size should be a multiple of 2 bytes and the start address should be on a half-word (2-byte) boundary. If the buffer is not also aligned on a DMA block size boundary, transfers will be inefficient until the address aligns on a DMA block size boundary. For Data In FIFOs, data transfer is most efficient if the programmer ensures the buffer sizes are a multiple of the DMA transfer block size and the start address is aligned on a DMA transfer block size boundary.

The following registers (indicated above in Table 1) are employed in scatter/gather mode:

9—Data In FIFO Packet Descriptor Table Pointer (updated in place)
10—Data Out FIFO Buffer Descriptor Table Pointer (updated in place)
11—Data In FIFO Buffer Descriptor Table Pointer (updated in place)
24—Data Out FIFO DMA Address (updated in place)
25—Data Out FIFO Buffer-End Interrupt Address
26—Data In FIFO DMA Address (updated in place)
27—Data In FIFO Buffer-End Interrupt Address
32—Data In FIFO Packet Descriptor Table Tail Pointer
33—Data In FIFO Packet Descriptor Status
34—Data In FIFO Packet End Interrupt Address All of these registers are read/write except for 33, which is readable and write-to-clear. DMA registers 24 and 26 contain the current transfer address in the buffer and may be read at any time to monitor the progress of a transfer. DMA registers 25 and 27 contain interrupt addresses. Registers 10 and 11 contain buffer descriptor table entry addresses, which point to the next buffer descriptor to be used. When scatter/gather is enabled, bit 30 in the FIFO parameters register is undefined. The layouts of scatter/gather registers 9, 10, 11, 32, and 33 as well as buffer descriptors, packet descriptors, and the packet end interrupt value written upon packet-end interrupt are shown below in Table 4.

TABLE 4

| Reg. No | Type | Reg Name | Bit | Bit Name | Function |
|---|---|---|---|---|---|
| 9 | BIU | Packet Descriptor Table Pointer | 31:3 | Address | Address bit 31:3 of the table start; bits 2:0 are always 0 |
| | | | 2:0 | Size | # of Table entries: 0 => Disable packet descriptor generation 1 => # entries is 32 2 => # entries is 64 3 => # entries is 128 4 => # entries is 256 5–7 => reserved |
| 10 | BIU | Data Out FIFO Buffer Descriptor Table Pointer | 31:3 | Address | Address bits 31:3 of start of table; bits 2:0 are always 0 |
| | | | 2:1 | | Reserved |
| | | | 0 | SGE | Scatter/Gather Enable |
| 11 | BIU | Data In FIFO Buffer Descriptor | 31:3 | Address | Address bits 31:3 of start of table; bits 2:0 are always 0 |

TABLE 4-continued

| Reg. No | Type | Reg Name | Bit | Bit Name | Function |
|---|---|---|---|---|---|
| | | Table Pointer | 2 | PEI | Interrupt at Packet End; 1 => interrupt |
| | | | 1 | | Reserved |
| | | | 0 | SGE | Scatter/Gather Enable |
| 32 | BIU | Packet Descriptor Table Tail Pointer | 31:11 | | Read/write bits ignored by BIU |
| | | | 10:3 | | Address bits of last packet descriptor processed |
| | | | 2:0 | | Reserved |
| 33 | BIU | Packet Descriptor Status Register | 31:13 | | Reserved |
| | | | 12:3 | count | count of non-updates of table because it was full; saturates at 0x3ff |
| | | | 2:0 | | Reserved |
| LSW | MEM | Buffer Descriptor Table Entry - Word 0 | 31:0 | Address | Buffer Address |
| MSW | MEM | Buffer Descriptor Table Entry - Word 1 | 31 | EOBI | Interrupt at end-of-buffer; 1 => interrupt |
| | | | 30 | EOBT | Terminate of end-of-buffer; 1 => clear SGE bit of reg 10 or 11 |
| | | | 29:28 | | Reserved |
| | | | 27:21 | NEXT | Address bits 9:3 of next entry to use |
| | | | 20 | | Reserved |
| | | | 19:0 | BSIZE | Buffer Size |
| LSW | MEM | Packet Descriptor Table Entry - Word 0 | 31:0 | | Packet address |
| MSW | MEM | Packet Descriptor Table Entry - Word 1 | 31 | PINC | Packet incomplete; 1 => incomplete |
| | | | 30 | PLAST | Last part of incomplete packet; 1 => last part |
| | | | 29:20 | | reserved |
| | | | 19:0 | PSIZE | Packet size |
| | | Packet End Interrupt Write Value | 31:4 | | reserved |
| | | | 3:2 | Channel | DMA channel of FIFO causing interrupt |
| | | | 1 | Direction | 0 => Data in FIFO, 1 => Data Out FIFO |
| | | | 0 | Type | 0 => End of buffer, 1 => End of packet |

Figure 5:
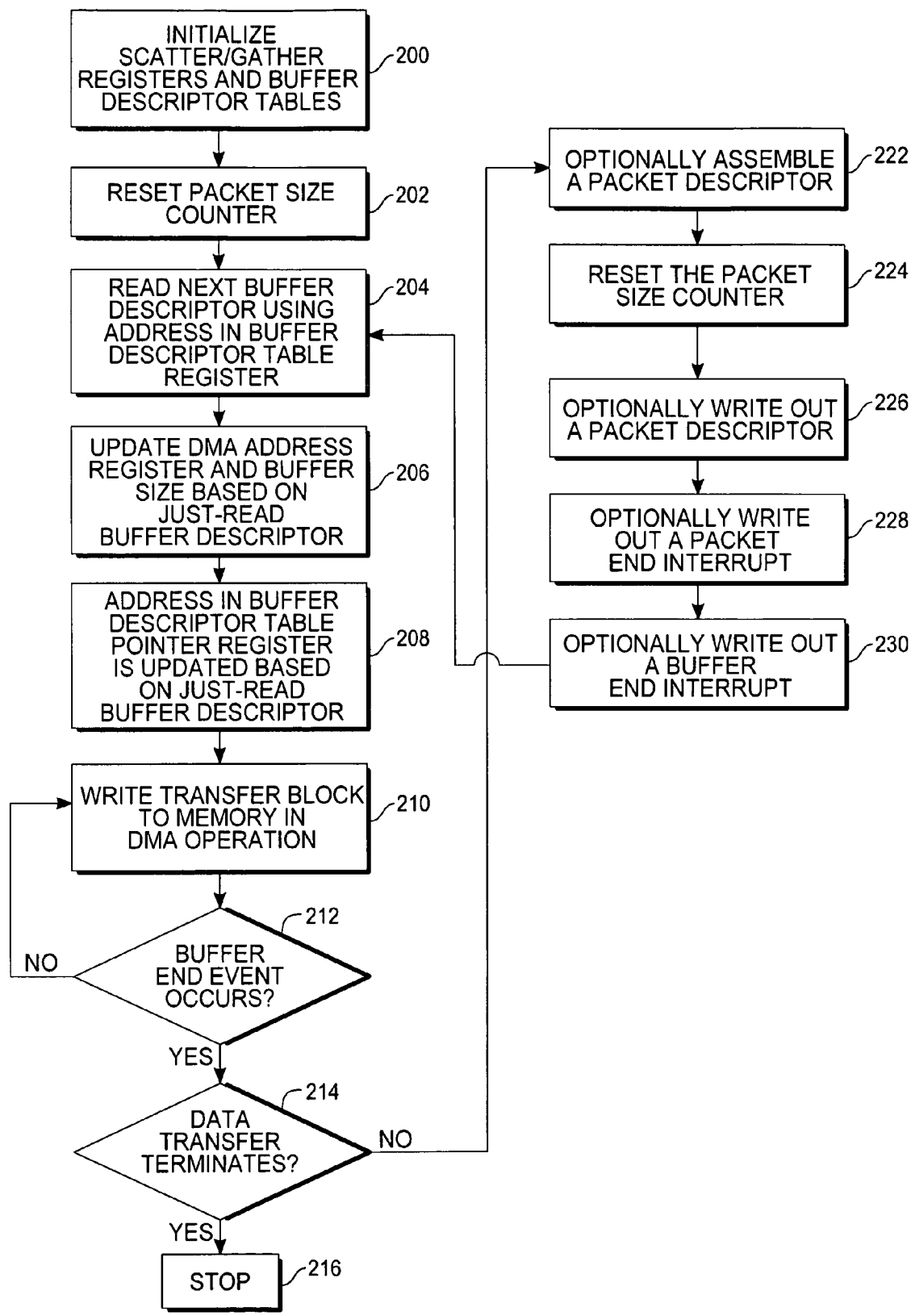
FIG. 5 is a flowchart showing how automatic buffer switching is performed in accordance with the invention.

With reference to FIG. 5, when scatter/gather is enabled, the scatter/gather registers and buffer descriptor tables are initialized (block 200). (As shown in Table 4, above, scatter/gather is enabled if the SGE bit (bit 0) in register(s) 10 and/or 11 is set to 1; writing 0 to bit 0 in these registers will terminate any scatter/gather operations in progress, forcing scatter/gather systems to idle.) The packet size counter is reset (block 202) and the next (here, the first) buffer descriptor (the address in the buffer descriptor table register) is read (block 204). The DMA address register and buffer sized are updated based on the just-read buffer descriptor (block 206). The address in the buffer descriptor table pointer register is updated based on the just-read buffer descriptor (block 208). The transfer block is then written to memory in a DMA operation (block 210).

Automatic buffer switching takes place when a buffer end event occurs (block 212). A buffer end event occurs when a transfer block is written to/from memory and the current buffer becomes full/empty. If no buffer end event occurs (block 212), the DMA operation continues (block 210). If a buffer end event occurs (block 212), and data transfer terminates (block 214) (as will be discussed in greater detail below, an end-of-buffer event may cause a scatter/gather operation to terminate), the process stops (block 216). However, if data transfer is not terminated (block 214), automatic buffer switching takes places to allow the DMA operation to continue. A packet descriptor is optionally assembled (block 222). The packet size counter is reset (block 224). A packet descriptor, a packet end interrupt, and a buffer end interrupt (discussed in greater detail below) are optionally written out (blocks 226, 228, and 230); the packet end interrupt and buffer end interrupt allow the controlling processor to initiate packet and buffer processing when a packet is complete or when the buffer is ready without constant status polling. In automatic buffer switching, the BIU reads the next buffer descriptor using the address in the buffer descriptor table pointer register (block 204). The DMA address register and the buffer size are updated based on the just-read buffer descriptor (block 206). The address in the buffer descriptor table pointer register is updated based on the just-read buffer descriptor (block 208) and the transfer block is written to memory (block 210). DMA transfers should have priority over descriptor and interrupt generation. In one embodiment, reading the next buffer descriptor (block 204) may be done ahead of time and updating the DMA address register and buffer size and optionally assembling a packet descriptor may be done in parallel in the cycle following the buffer-end event. In this embodiment, buffer switching will take only one cycle. The time to complete buffer switching is very short since buffer switching, which is done by hardware and is decoupled from software, requires one local memory access only; in one embodiment, it requires 20 local bus cycles or less to complete. If reading the next buffer descriptor from memory is done ahead of time, buffer switching time can effectively be reduced to 5 nsecs.

If a protocol is used where the packet size is not always a multiple of the DMA block transfer size, the BIU needs to be told when an incoming packet has ended in order to force the last few bytes to be written to memory. This is particularly important for incoming packets since packets generally will not be a multiple of DMA block transfer size and therefore the BIU needs to be told when the packet has ended in order to force the last few bytes to be written to memory.

In order to get the BIU to boundary align input data, the PSM issues a Clock Data In and Round Up command at the end of a packet. (In some embodiments, the Clock Data In and Round Up Command also gets the BIU to generate packet descriptors and end-of-packet interrupts.) Boundary alignment means that the Data In FIFO DMA address is incremented by the DMA block size regardless of the actual amount of data written to the FIFO when the Round Up command, which is associated with the last byte of a packet, was received. As a result, the next packet that is written out will start on a DMA block size boundary.

A buffer end interrupt causes a 32-bit write to the address specified in DMA register 25 or 27 (depending on whether the FIFO is Data In or Data Out) indicating the interrupt type and DMA channel number. (In this embodiment, the DMA block transfer size is 32 bits; in other embodiments with different block transfer sizes, the bit length of the write is equal to the DMA block transfer size.) When the PE receives a buffer end interrupt it will possibly write new value(s) to the table entry whose buffer has just been emptied or filled and possibly process the data in a just-filled buffer.

As noted above, the BIU can optionally write out a packet descriptor to a packet descriptor table upon detecting an end-of-packet event, which may include an end-of-buffer event. An end-of-packet event occurs one of two ways: 1) when the last byte of a packet, indicated by a Round Up command, has been written out to memory; or 2) when the current buffer fills up but the current packet is not finished (i.e., an end-of-buffer event where no Round Up command is associated with the DMA transfer block that fills up the current buffer). The packet descriptors are written to the current location in the packet descriptor table, in one embodiment, an octet-aligned circular buffer in I/O Quad data memory. In one embodiment, the packet descriptor table can be as little as 32 packet descriptors (256 bytes) or as large as 256 (2048 bytes) packet descriptors. The packet descriptor table pointer register (DMA register 9), which points to the location that will be written to when the next packet descriptor is written out, is updated in place and can be polled to determine whether there are any new packet descriptors to be processed. The start address and size of the packet descriptor table are derived from the packet descriptor table pointer register.

The packet descriptor includes a packet start address, a packet size, and a bit indicating whether the packet is split across a buffer boundary. In one embodiment, packet descriptors are octet-aligned and 8 bytes long. An exemplary format is shown in Table 4. PSIZE contains the packet size (if bit 31 is clear) or the size of the current packet fragment (if bit 31 is set, indicating a packet end event was caused by a buffer switch where the last transfer block to fill up the buffer did not have a Round Up command associated with it and allowing the PE/MTE to detect when a packet is split across buffers). Bit 30 is set if bit 31 was set for the last packet descriptor and this packet descriptor was generated due to a Round Up command. Bits 31 and 30 allow the PE/MTE to determine if the packet is a complete packet (bits 31:30 have the logic values 0,0), the first part of a packet (bits 31:30 have the logic values 1,0), or the last part of a packet that was split across buffers (bits 31:30 have the logic values 0,1). This is useful if one of the packet descriptors for a packet split across two buffers is lost, since it allows the software to quickly determine if parts of a split packet were lost due to packet descriptor table being full (discussed in greater detail below).

A packet end interrupt is optionally issued (depending on the setting in the buffer descriptor table pointer register) after a packet end event due to Round Up occurs. The packet end interrupt causes a 32-bit write to the address specified in DMA register 34, the packet end interrupt address. The value written indicates the interrupt type and the DMA channel number. If packet descriptor generation is enabled (bits 2:0 of the packet descriptor table pointer register are not 0,0,0), and packet end interrupts are enabled, then the packet end interrupt is generated after the packet descriptor has been written out to memory.

Figure 6:
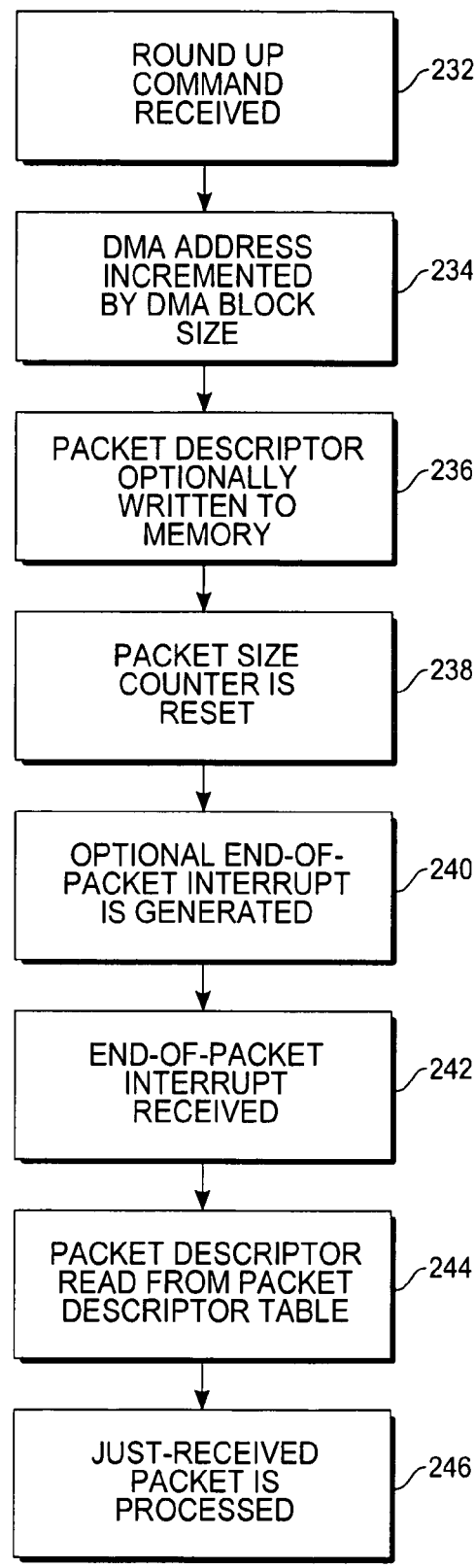
FIG. 6 is a flowchart showing how boundary alignment is performed in accordance with the invention.

In FIG. 6, when the BIU receives a packet with a Round Up command (block 232) and writes the block out to memory, the DMA address is incremented by the DMA block size (block 234), forcing the next packet to start on the DMA block size boundary. When the block associated with the Round Up command is written out to memory, a packet descriptor is optionally written out to memory by hardware (block 236). The packet size counter is reset (block 238). An optional end-of-packet interrupt is generated (block 240). When the PE receives an end-of-packet interrupt (block 242), the packet descriptor is read from the packet descriptor table (block 244). The just-received packet is then processed (block 246).

The packet descriptor table never overflows due to hardware throttling of packet descriptors. When the table is full, packet descriptors are not written out and the packet is dropped. The table is almost full when the head pointer (the packet descriptor table pointer register) is equal to the packet descriptor table tail pointer register minus 8; indicating there are only two available slots in the table. These slots are never filled and the packet descriptors are dropped to prevent overflow. As noted above, when scatter/gather is enabled, the packet descriptor table tail pointer is initialized to point to the packet descriptor table start address, signaling the table is empty. DMA register 33, the Data In FIFO packet descriptor status register, counts the number of times a packet descriptor is dropped. This register saturates at 0x3FF. Writing to this register, which is a write to clear register, causes the COUNT field to be reset to 0.

A buffer end condition (where the current buffer fills up with incoming data or is emptied of outgoing data) may terminate scatter/gather operation. If the EOBT bit (as shown in Table 4) is set, an end-of-buffer event will clear the scatter/gather enable ("SGE") bit, causing hardware to terminate scatter/gather operation without software intervention. Termination of scatter/gather operation may occur when the data stream is finished. (Other operations may continue in scatter/gather mode.)

In some embodiments where wider interfaces are used, such as 16-bit or 32-bit devices, the packet size may not be a multiple of device width. When this occurs, the packet descriptor PSIZE field will include the unused bytes in the last I/O bus transfer because the BIU has no way of knowing how many of the last bytes are valid when it receives a Round Up command.

In one embodiment, a status byte is appended to the end of a packet when the PSM issues one of two commands—Input Status or Input Status and Round Up. The status byte notifies the PE how many of the last "device width" bytes are valid and the PE can then update the packet descriptor or internally use the corrected value. When either of these commands is issued, the 8-bit status from the PSM and pins will be clocked into the pin group's Data In FIFO. If the Input Status and Round Up command is issued, the Round Up bit will be set for that byte of data. When either of these commands is issued, the status generated in the Data In FIFO's pin group is pushed to the pin group's Data In FIFO.

What is claimed is:

1. A method of transferring data between a processor and an attached direct memory access ("DMA") device in scatter/gather mode comprising:
   a) transferring a packet of data from the DMA device to the processor;
   b) detecting an end-of-packet condition; and
   c) writing out a packet descriptor to a table in memory, wherein the packet descriptor includes a packet start address, a packet size, and a bit indicating whether the packet is split across a buffer boundary.

2. The method of claim 1 further comprising resetting a packet size counter.

3. The method of claim 1 further comprising generating an end-of-packet interrupt.

4. The method of claim 3 further comprising initiating packet processing.

5. The method of claim 1 further comprising boundary-aligning input data.

6. The method of claim 1 further comprising throttling packet descriptors when the table is full.

7. The method of claim 1 further comprising maintaining a table of buffer descriptors for determining a start address and size of a next buffer to be used when transferring data when a current buffer counter reaches zero, wherein entries in the table are linked programmatically.

8. The method of claim 7 further comprising automatically switching buffers when the selected buffer counter reaches zero, wherein a next buffer descriptor table entry is read from memory and a new buffer pointer and size is updated based on the table entry.

9. The method of claim 1 further comprising terminating scatter/gather operation after detecting a end-of-buffer condition when a data stream is finished.

* * * * *